United States Patent [19]
Craven, Jr. et al.

[11] Patent Number: 5,458,309
[45] Date of Patent: Oct. 17, 1995

[54] WIRE TANK SUPPORT BRACKET

[76] Inventors: Joseph B. Craven, Jr., 6 Eden Ct.;
Brad Pearce, 1117 Laurelwood Rd.,
both of Columbus, Ga. 31904

[21] Appl. No.: 106,376

[22] Filed: Aug. 13, 1993

[51] Int. Cl.$^6$ ...................................................... A47F 5/08
[52] U.S. Cl. ..................... 248/231.9; 126/41 R; 248/302
[58] Field of Search ..................................... 248/230, 231,
248/231.9, 302, 303, 154, 312, 312.1, 129,
505; 126/41 R

[56] References Cited

U.S. PATENT DOCUMENTS

| | | | |
|---|---|---|---|
| 3,463,429 | 8/1969 | Novak | 248/154 X |
| 4,150,806 | 4/1979 | Dziuk | 248/154 |
| 4,949,701 | 8/1990 | Krosp et al. | 126/41 R |
| 4,955,573 | 9/1990 | Horvath | 248/154 X |
| 4,984,515 | 1/1991 | Pivonka | 99/449 |
| 5,076,252 | 12/1991 | Schlosser et al. | 126/41 R X |

*Primary Examiner*—Ramon O. Ramirez

[57] ABSTRACT

A wire tank support bracket for cart mounted fuel tanks, particularly LP gas tanks for barbecue cart and grill assemblies, the LP gas tank being securely fastened to a bottom shelf assembly of the cart assembly by a bracket. The bracket has two ends pivotally supported upon opposed legs of the cart assembly, and a spring comprised of a curved section and two adjacent square sections engages the tank collar of the LP gas tank, securing the LP gas tank to the cart assembly.

7 Claims, 1 Drawing Sheet

WIRE TANK SUPPORT BRACKET

FIELD OF THE INVENTION

This invention relates to barbecue grills, and more particularly, to a wire tank support bracket for use with cart mounted barbecue grills fueled by an LP gas source, such as liquid propane, contained in a gas cylinder secured upon the barbecue grill cart assembly.

BACKGROUND OF THE INVENTION

Gas fired barbecue grills are commonly mounted on wheeled carts and are fueled by LP gas, such as liquid propane gas, from a tank mounted on the cart. Typically, an LP gas tank is mounted on a supporting strut or on a lower shelf of the cart, usually on one side or the other of the cart, which tends to balance the normally top heavy cart/grill assembly and, by mounting the tank to the side of the cart, provides both easy access for removing and replacing the tank. Such mounting also provides a cooler environment for the tank than a central location under the grill. As noted, liquid propane is used to fuel the barbecue grill and when the tank has been emptied, it is removed from its mounted position upon the cart and transported to a refilling station. After the tank has been refilled, it is then mounted beneath the grill and reconnected to a gas regulator hose assembly, whereupon the grill may be utilized for barbecuing once again.

Most grills include a means for securing the LP gas tank to the barbecue grill cart. This has been accomplished by seating the LP gas tank on a strut or on the bottom shelf assembly of the grill cart in any suitable manner, such as with mounting clips, or other receiving means. The top of the tank is then typically secured with a plurality of clips, springs, or other means, some of which may be incorporated into a fuel gauge. Other methods used for securing LP gas tanks to grill carts have been to encircle the LP gas tank with a belt or strap, as disclosed in U.S. Pat. No. 4,949,701 issued to Krosp, et al., and U.S. Pat. No. 4,984,515 issued to Pivonka, respectively, or to mount the LP gas tank upon clips supported upon a leg of the grill cart as disclosed in U.S. Pat. No. 5,076,252 to Schlosser, et al.

Although the prior art teaches what appear to be relatively simple methods of securing LP gas tanks to barbecue grill carts, there are certain disadvantages in the prior art. The belt or strap method used with encircling a gas tank, as disclosed in Krosp, et al. and Pivonka, may not provide the option of utilizing a fuel gauge in combination with the tank support. The clip method for retaining an LP gas tank upon a grill cart, as disclosed in Schlosser, et al. requires the person or persons wishing to replace the LP gas tank upon the grill cart to lift a filled propane gas tank a considerable distance and place it upon two clips supported upon a leg of the grill cart above the bottom shelf of the grill cart and below the grill assembly. The bottom shelf or struts of the grill cart cannot be utilized to partially support the LP gas tank during the time in which it is being secured to the cart. Moreover, the mounting clips disclosed in Schlosser, et al. engage both the bottom rim of the LP gas tank and the carrying handle in the upper collar of the LP gas tank, which thus may require consumers to lift the tank without benefit of using the hand hold in the tank collar to place the tank in position on the clips above the bottom shelf of the grill cart, prior to lowering the tank down onto the mounting clips. Thus, the need exists in the art for a means to securely and easily fasten and remove an LP gas tank for a barbecue grill which can be accomplished with a minimum amount of lifting of filled LP gas tanks and which secures the tank so that it can not be dislodged during normal use of the grill.

SUMMARY OF THE INVENTION

It is therefore, one of the principal objects of the present invention to provide a wire tank support bracket for LP gas tanks, the tanks normally being mounted on a barbecue grill cart, so as to provide a simple method for securing an LP gas tank to a barbecue grill cart.

Another object of the present invention is to provide a wire tank support bracket that is easily installed upon a barbecue grill cart and that can be easily removed from an LP gas tank so that the tank can be easily removed for refilling, and can be easily reattached to the LP gas tank by the consumer.

A further object of the present invention is to provide a wire tank support bracket that is inexpensive to manufacture and maintain, is durable and will provide a long service life, and which is adaptable for use on LP gas tanks and grill carts having varying configurations.

These and other objects are attained by the present invention which relates to a wire tank support bracket for LP gas tanks to be secured to barbecue grill carts. The wire tank support bracket is comprised of a curved wire rod having a first and second end, which ends are constructed and adapted to be pivotally supported upon at least two of a grill cart's legs. The bracket can be pivoted upward to an open position so that an LP gas tank may be placed upon a strut or the bottom shelf of the barbecue grill cart, and can then be pivoted downward into a closed position in engagement with the tank collar of the LP gas tank in order to secure the tank to the barbecue grill cart. The first and second ends of the rod means are secured to the legs of the barbecue grill cart in a common horizontal plane with the rod engaging the LP gas tank collar through fastening means fabricated into the rod.

Various additional objects and advantages of the present wire tank support bracket will become apparent from the following description, with reference to the accompanying drawings.

DETAILED DESCRIPTION OF THE PREFERRED EMBODIMENT

Figures 1, 2, 3, 4:
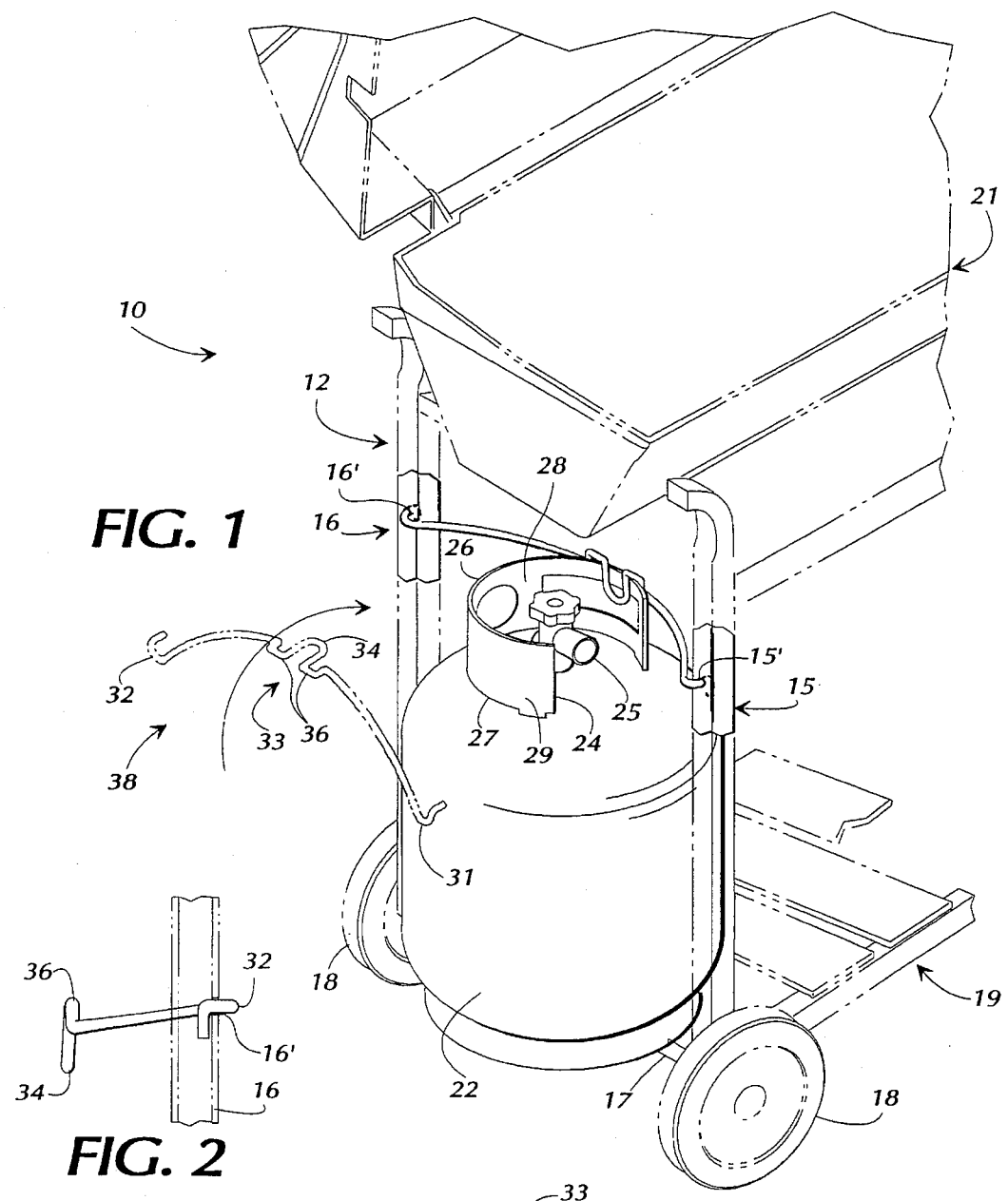
FIG. 1 is a partial perspective view of a barbecue grill and cart assembly showing an LP gas tank mounted thereon and secured by a preferred embodiment of the present invention.
FIG. 2 is a side elevational view of the preferred embodiment illustrated in FIG. 1.
FIG. 3 is a front elevational view of the preferred embodiment of FIG. 1.
FIG. 4 is a top plan view of the preferred embodiment illustrated in FIG. 1.

Referring now more specifically to the drawings and to FIG. 1 in particular, numeral 10 designates generally a barbecue grill and cart assembly with which the present invention is utilized. In general, cart assembly 12 includes two leg assemblies of which front leg 15 and a rear leg 16 are shown, connected by a common strut 17. Wheels 18 are connected to the cart legs to provide mobility, as is well known in the art. Bottom shelf assembly 20 and upper grill assembly 21 complete the barbecue grill cart, forming the rigid structure which serves to both support and transport grill assembly 21. An LP gas tank 22 will typically be received or supported upon the strut 17, the strut being configured to secure the bottom of the tank, so that the tank can not be dislodged during normal use and until removal is necessary to refill the tank.

LP gas tanks, such as gas tank 22 shown in FIG. 1, typically further comprise a tank collar or carrying handle 24 having upper and lower circumferential edges 26 and 27, respectively and inner and outer circumferential surfaces 28 and 29, respectively. The lower circumferential edge is normally welded to the upper portion of the gas tank, and constructed in a circular shape so as to protect the LP gas valve 25 to which a gas regulator hose assembly (not shown) is attached for the purposes of conveying LP gas to the burner unit in the grill assembly. It is common practice that tank collar 24 will double as a device for protecting the propane valve 25 and as a carrying handle for transporting the LP gas tank to refilling stations, and for return to the barbecue grill can assembly for reinstallation.

As best shown in FIGS. 2 through 4, bracket 30 is comprised of a first end 31 and a second end 32 which are shaped in substantially identical fashion but which are mirror images of one another. Bracket 30 further comprises spring section 33, itself comprised of a curved section 34 and two adjacent squared sections 36 which together form a spring clip means in the bracket so that the bracket may then be fastened upon the upper edge of tank collar 24. Bracket 30 is constructed of any conventional metal wire material, preferably steel, and can be finished in any manner conventional to the field of the art to include painting, and coating with a porcelain enamel finish.

Referring now to FIG. 1, bracket 30 is installed upon cart assembly 12 by inserting ends 31 and 32 into a pair of openings 15', 16', respectively, the openings being deemed in common horizontal and vertical planes in the exterior surface of legs 15 and 16, respectively. Once ends 31 and 32 are slid into openings 15' and 16', bracket 30 is rotated downwardly through an arc so that spring section 33 engages tank collar 24. The curvature of ends 31 and 32 is such that upon this rotation, it is impossible to pull the bracket out of the holes in the cart leg, thus meeting the American National Standards Institute standards for tank securement. More particularly, curved spring section 34 is clipped to the inside circumferential surface of tank collar 24 along a tangent line for both bracket 30 and tank collar 24, and square sections 36 engage both the upper circumferential edge of tank collar 24, as well as its outside circumferential surface. This provides at least six contact points between the present bracket and the tank collar. In combination, the curved ends of the bracket mounted in the holes of the cart leg, the mounting of the tank on the bottom strut, and the contact points between the bracket and the tank collar provide an extremely secure mounting.

As best shown in FIG. 2, ends 31 and 32 and square sections 36 of bracket 30 lie essentially in a common horizontal plane. FIG. 2 also reveals how bracket 30 is pivotally supported on legs 15 and 16. As illustrated in FIG. 2, end 32 is received within opening 16' deemed in leg 16. End 31 is received within opening 15' in leg 15 in similar fashion. As shown in FIG. 4, bracket 30 is constructed in a arcuate or semi-circular shape, thereby enhancing the performance of spring section 32 and following the curvature of the tank collar to the degree necessary to provide engagement therewith, as discussed hereinabove.

When it is desired to remove bracket 30 from LP gas tank 22 and tank collar 24, bracket 30 is rotated upwards upon its ends 31 and 32 into an open position so that curved section 34 and square sections 36 no longer engage tank collar 24. Tank 22 can then be readily lifted up and off of strut 17 or the bottom shelf assembly 20 for refilling. The advantage of utilizing a bracket such as that disclosed in the preferred embodiment is that bracket 30 can be readily left in its open position so that a second LP gas tank 22 can then be easily installed underneath grill assembly 21. The tank can then be quickly secured to cart assembly 12 by rotating bracket 30 downwards into in a closed position in engagement with tank collar 34. There is thus no need to belt or strap LP gas tank 22, nor is there a need to fasten any such belt or strap ends to each other for encircling the LP gas tank. Moreover, a distinct advantage of the preferred embodiment is that the refilled LP gas tank need only be lifted a few inches to place the bottom of the tank on strut 17 or other support means. The bracket 30 then engages tank collar 24, providing a quick, safe, and easy means for securing an LP gas tank to a barbecue grill cart assembly.

It is also anticipated that bracket 30 can be utilized with, or in lieu of, an LP gas tank fuel measuring device, such as that disclosed in U.S. Pat. No. 5,056,364 to Kahler, et al., assigned to common assignee W. C. BRADLEY COMPANY. Similarly, it is anticipated that the preferred embodiment of the wire tank support bracket can also be utilized in combination with fuel gauge assemblies utilizing an LP gas tank mounting bracket wherein the fuel gauge assembly is operated by the degree of leaning of the tank to one side or the other. The leaning is caused by the off-center mounting of the tank on the strut 17 or other support means.

While an embodiment of a wire tank support bracket and modifications thereof have been shown and described in detail herein, there are additional changes and modifications which may be made without departing from the scope of the present invention.

We claim:

1. A bracket for securing a generally cylindrical LP gas tank with a cylindrical upper collar, to a barbecue grill cart assembly having a plurality of generally vertical leg members disposed between an upper grill assembly and a bottom shelf assembly upon which said tank is supported, said bracket further comprising a rod having first and second ends connected between two of said leg members in common horizontal and vertical planes, and spring clip for removably attaching said bracket to the cylindrical gas tank collar said collar having inner and outer circumferential surfaces wherein said spring clip is removably attached to both inner and outer circumferential surfaces of said cylindrical collar for holding said tank in a generally fixed position upon the cart assembly.

2. A bracket as defined in claim 1, wherein said bracket is substantially arcuate for engaging a portion of said cylindrical collar.

3. A bracket as deemed in claim 2, wherein said first and second ends of said rod are removably received within and pivotally supported upon said leg members whereby said bracket can be pivoted upward to an open position so that the gas tank can be installed or removed from said cart assembly, and said bracket can also be pivoted downward into a closed position for attaching the fastening means of said bracket to the gas tank.

4. A bracket as defined in claim 1, wherein said spring clip further comprises a curved section for engaging the inside circumferential surface of said tank collar, and two square spring sections adjacent said curved section for engaging the outside circumferential surface of said tank collar along a tangent line between said bracket and said tank collar.

5. A bracket for securing an LP gas tank to a barbecue grill cart assembly having a plurality of generally vertical leg members disposed between an upper grill assembly and a bottom strut means upon which said tank is supported, said tank having a generally circular tank collar mounted upon the top of said tank, said collar having inner and outer circumferential surfaces, said bracket comprising a curved wire rod having first and second ends pivotally supported in common horizontal and vertical planes between two of said leg members, and a spring clip means for removably attaching said bracket to the gas tank for holding said tank in fixed position upon the cart assembly said spring clip means having a curved section and two adjacent square sections formed in said rod, said curved section removably engaging said inner circumferential surface and said square sections removably engaging said outer circumferential surface, said bracket being adapted to rotate upwardly into an open position for removal of said gas tank from said cart assembly and to rotate downwardly into a closed position for securing said tank to said cart assembly.

6. A bracket as defined in claim 5, wherein said bracket intersects said tank collar along a tangent line between said bracket and said tank for holding said tank in fixed position upon the cart assembly.

7. A bracket for securing an LP gas tank having an upper collar to a barbecue grill cart assembly, said cart assembly having a plurality of generally vertical leg members disposed between an upper grill assembly and a bottom support means upon which said tank is supported, said bracket comprising a substantially rigid rod member having first and second curved ends, said ends being received within and pivotally supported by two opposed leg members such that said bracket can be pivoted upwardly to an open position for installing the gas tank and pivoted downwardly to a closed position for securing the gas tank in place, said bracket further including fastening means for engaging said upper collar when said bracket is in the closed position.

* * * * *